United States Patent [19]

Bunch

[11] 3,901,398

[45] Aug. 26, 1975

[54] SEMI-TRAILER HAVING A HINGED RAMP MEMBER

[75] Inventor: Harry J. Bunch, Louisville, Ky.

[73] Assignee: Bunch Bellcrank Systems, Inc., Louisville, Ky.

[22] Filed: Feb. 22, 1974

[21] Appl. No.: 444,917

[52] U.S. Cl. ............... 214/506; 214/85; 280/106 T
[51] Int. Cl.[2] .......................................... B60P 1/28
[58] Field of Search ............ 214/501, 505, 506, 85, 214/85.1; 280/106 R, 106 T

[56] References Cited
UNITED STATES PATENTS

| | | | |
|---|---|---|---|
| 2,173,277 | 9/1939 | Jarmin et al. | 214/506 |
| 2,941,813 | 6/1960 | Price | 214/506 X |
| 3,064,842 | 11/1962 | Haynie | 214/505 |
| 3,693,818 | 9/1972 | Teagarden | 214/506 |

*Primary Examiner*—Albert J. Makay
*Attorney, Agent, or Firm*—Berman, Bishoff & Platt

[57] ABSTRACT

A semi-trailer consisting of a wheeled supporting truck having a transverse axle on which a main load-carrying bed member is pivotally supported. A depending box structure surrounding the axle is pivoted to the main bed member. A forwardly extending hitch frame is pivoted beneath the forward portion of the main bed member. Front link bars connect the box structure to the hitch frame. A ramp member is hinged to the rear edge of the main bed member. Rear link bars connect the ramp member to the box structure. A spring-biased telescopic strut assembly is provided between the box structure and the forward margin of the ramp member, biasing the ramp member toward alignment with the main bed member. An elevating jack is provided on the front end of the main bed member, acting against the hitch frame. When the elevating jack is operated, the linkage thus defined acts to lower the ramp member relative to the main bed member into ground contact as the front end of the main bed member is elevated.

11 Claims, 6 Drawing Figures

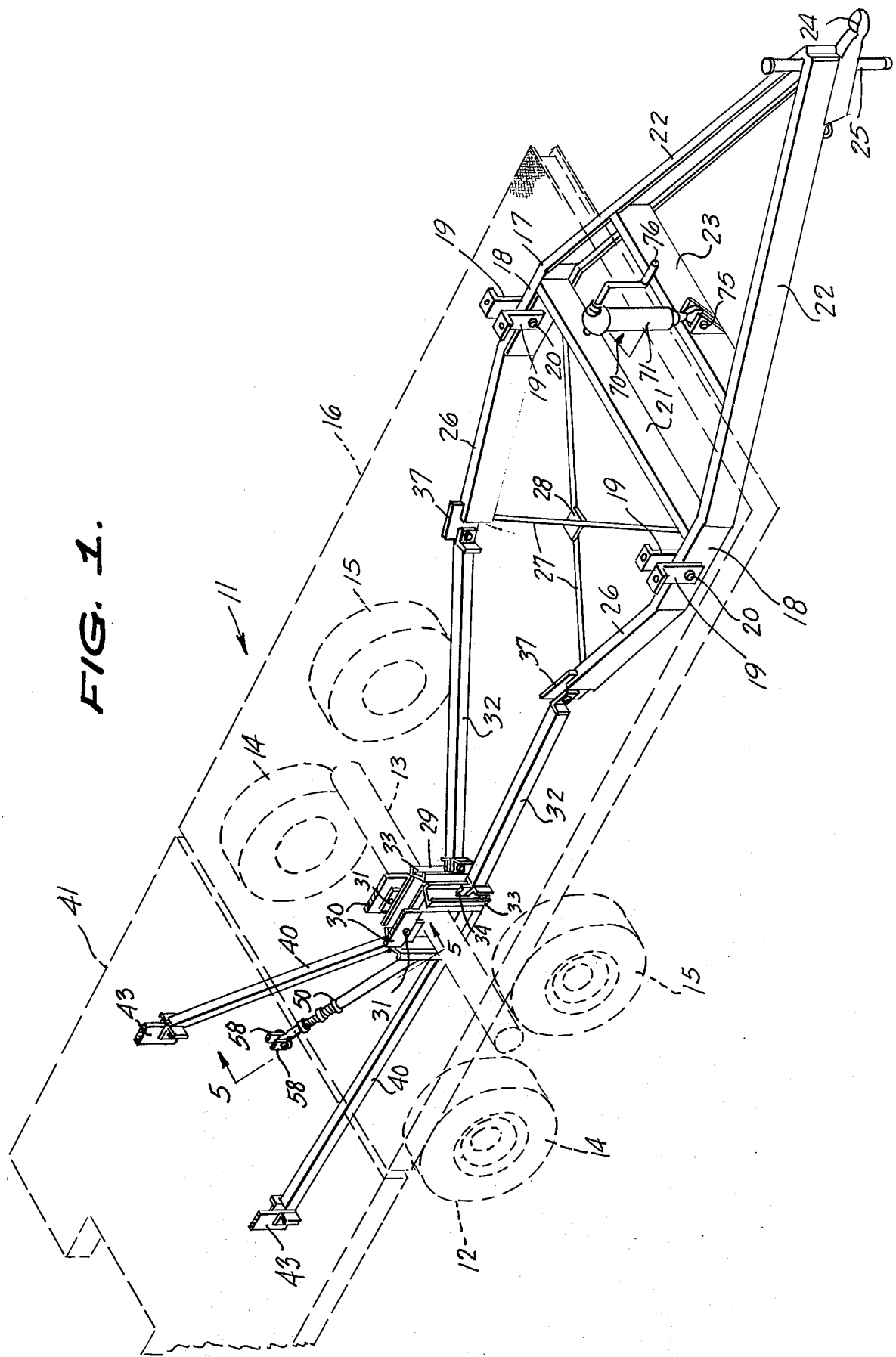

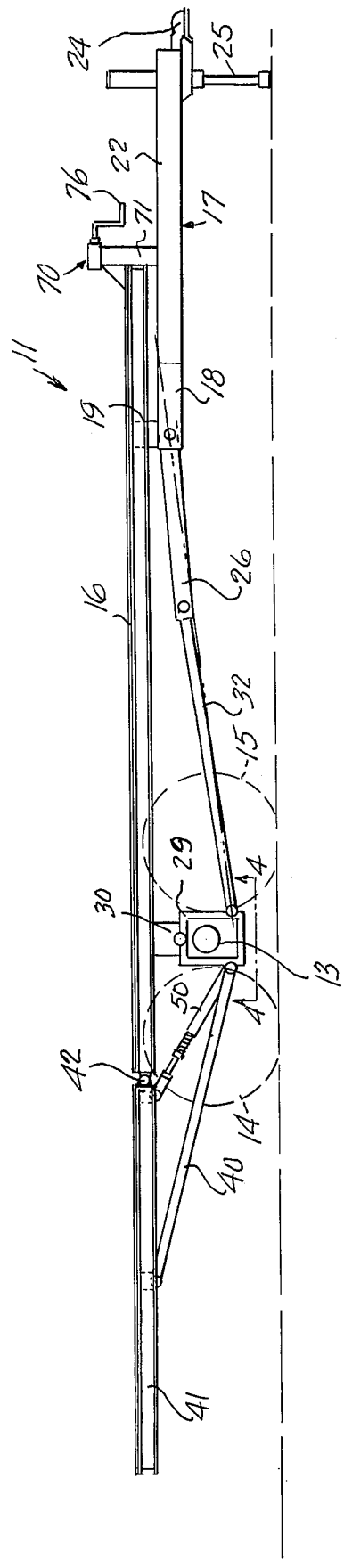
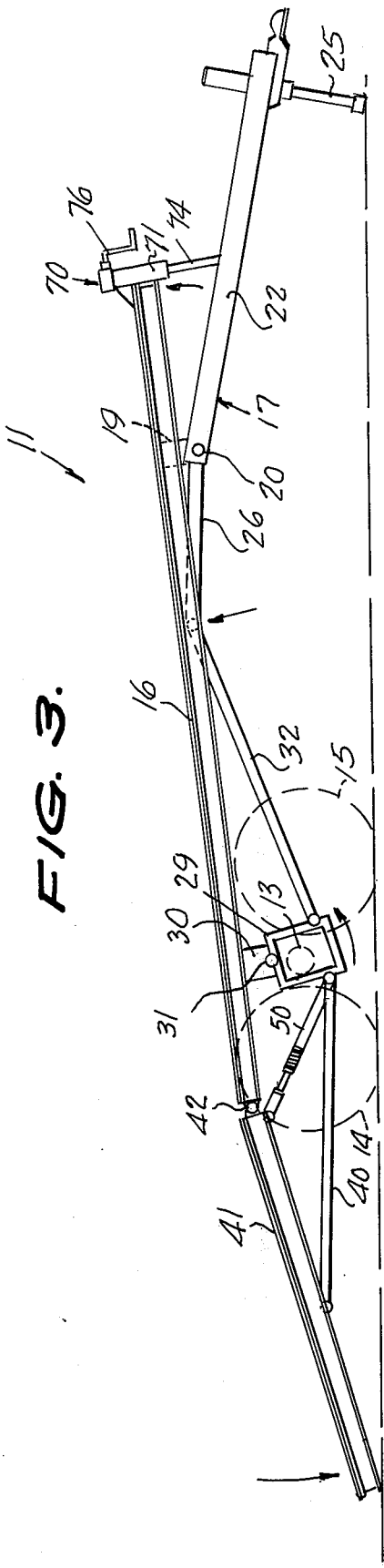

SEMI-TRAILER HAVING A HINGED RAMP MEMBER

This invention relates to semi-trailers, and more particularly to a cargo trailer to the type having a hinged rear platform member.

A main object of the invention is to provide a novel and improved semi-trailer having a hinged rear platform member and jack means for elevating the front end of the trailer relative to its hitch frame assembly, the improved semi-trailer being provided with means for automatically lowering the hinged rear ramp platform member as the front end of the main bed portion of the trailer is elevated, whereby to facilitate loading and unloading of cargo.

A further object of the invention is to provide an improved semi-trailer of the type having a hinged rear ramp member, with means to lower said ramp member responsive to the elevation of the front end portion of the main bed of the trailer, the rear ramp member being interconnected with the main bed member by an operating linkage which is of relatively simple construction, which involves inexpensive parts, and which is rugged in construction.

A still firther object of the invention is to provide an improved semi-trailer having a hinged rear ramp platform, the platform being operated automatically in response to tilting action of the main bed portion of the trailer, said main bed portion being provided with jack means cooperating with the pivoted hitch frame associated with the trailer to raise and lower the front end portion of the main bed member, said raising and lowering being accompanied by simultaneous lowering and raising of the rear hinged ramp member, the hinged ramp member being connected to the main bed portion of the trailer and the associated pivoted hitch frame by a simple operating linkage providing a highly efficient action and being relatively compact so that it is received beneath the main bed portion of the trailer without interference with other necessary components of the trailer assembly, for example, the associated wheeled supporting truck and transverse axle on which the main bed portion of the trailer is pivotally supported.

A still further object of the invention is to provide an improved semi-trailer of the type having a hinged rear ramp platform and having linkage means interconnecting the rear platform with other elements of the trailer assembly arranged to automatically rotate the hinged rear platform member relative to the main portion of the trailer bed as the forward end portion of the main trailer bed is raised or lowered, the improved assembly being further provided with resilient strut means to bias the rear platform member into a substantially coplanar relationship with respect to the main bed portion of the trailer assembly when the assembly is in its normal load-transporting position.

Further objects and advantages of the invention will become apparent from the following description and claims, and from the accompanying drawings, wherein:

FIG. 1 is a fragmentary, generrally diagrammatic prespective view showing a typical semi-trailer constructed in accordance with the present invention.

FIG. 2 is a side elevational view of the semi-trailer assembly of FIG. 1, shown in normal stationary position with its main bed portion and hinged rear ramp member in horizontal positions.

FIG. 3 is a side elevational view, similar to FIG. 2, but showing the main bed member with its front end elevated with the associated hinged rear ramp platform member lowered into ground contact for loading or unloading cargo.

Figure 4:
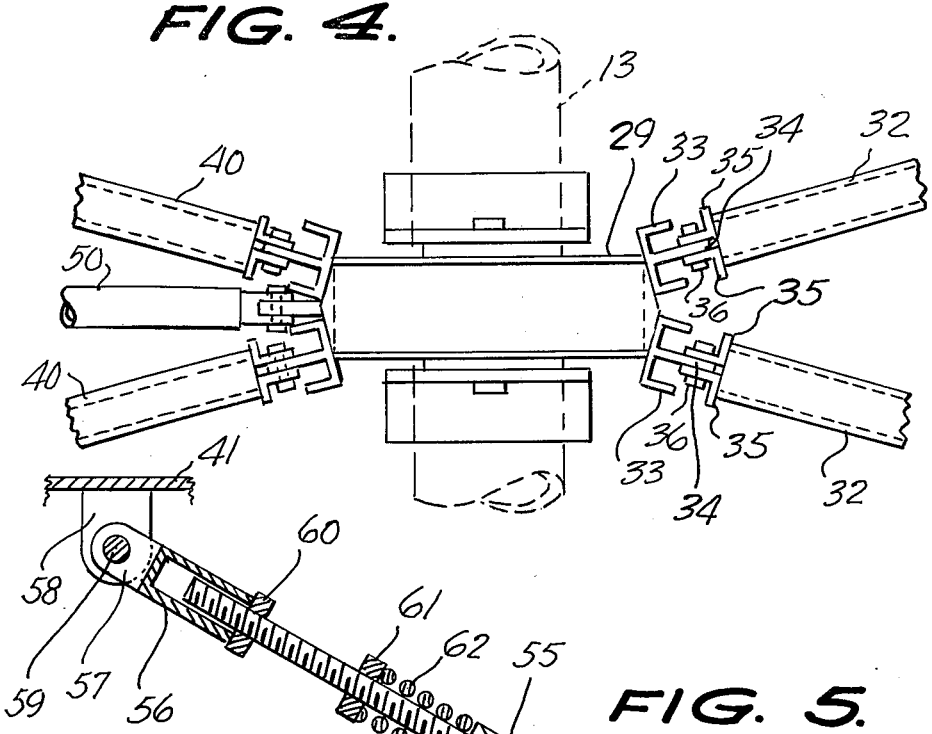
FIG. 4 is an enlarged fragmentary bottom view of portions of the linkage employed in the improved semi-trailer of FIGS. 1 to 3, said view being taken substantially on line 4—4 of FIG. 2, with certain parts of the tractor truck assembly shown in dotted view.

Referring to the drawings, 11 generally designates an improved semi-trailer assembly constructed in accordance with the present invention. The assembly 11 comprises a conventional wheeled truck portion 12 having a transverse axle member 13. Axle 13 is located substantially midway between the oppositely transversely aligned pairs of truck wheels 14, 14 and 15, 15. Designated at 16 is a main load-carrying bed member which is pivotally mounted at its rear portion on the transverse axle 13.

Designated at 17 is a forwardly extending hitch frame which is located beneath the forward portion of the main bed member 16 and which comprises side arms 18, 18 which are respectively pivotally connected between pairs of depending supporting brackets 19, 19 secured to the underside of the forward portion of main bed member 16, the arms 18, 18 being received between the arms 19, 19 and being pivotally connected thereto by respective pivot pins 20, 20 which are aligned on a common transverse axis with respect to bed member 16. The arms 18, 18 are rigidly connected together by a transverse cross bar 21, and said arms have forwardly convergent front portions 22, 22 which are also rigidly connected together by another transverse cross member 23, as shown in FIG. 1. The convergent arm portions 22, 22 are rigidly united at their front ends and have secured thereto a conventional hitch tongue member 24. The front end of the hitch frame 17 is provided with a conventional supporting means, such as a ground-engaging supporting leg 25 which extends substantially perpendicularly to the hitch frame 17 and which is substantially vertical when hitch frame front bar portions 22 are in a horizontal position, as shown in FIG. 2.

Hitch frame 17 has rearwardly convergent side arm portions 26, 26 which extend rearwardly from the intermediate elements 18, 18 and have their end portions respectively connected to the opposite end portions of cross bar member 21 by the diagonal brace rods 27, 27 which are in turn rigidly connected together at their midportions by a connection plate 28, whereby the rear portion of hitch frame 17 is made substantially rigid.

The side bars 26, 26 are angled downwardly relative to the forward portion of the hitch frame, namely, relative to the plane of bars 18, 18 and their forward extensions 22, 22, for a purpose presently to be described.

Designated generally at 29 is a fulcrum member, or box-like frame member, which surrounds the axle 13 and which is pivotally connected at the intermediate portion of its top arm to a pair of depending bracket members 30, 30 secured to the underside of the rear portion of main bed member 16, the pivotal connections, shown at 31, 31 being a common transverse axis. Designated at 32, 32 are a pair of forwardly divergent link bars which are connected between the lower portion of the forward side of the box-like frame member 29 and the rear ends of the hitch bar elements 26, 26. Thus, the front portion of frame 29 is provided at its lower corner with a pair of forwardly facing channel-shaped brackets 33, 33 in which are welded vertical web elements 34, 34, and the rear ends of the link bars 32, 32 are provided with spaced end angle brackets 35, 35 receiving the web member 34 therebetween and pivotally connected thereto by pivotal bolts 36. The front ends of the link bars 32, 32 are pivotally connected in a similar manner to vertical plate elements 37, 37 rigidly secured to the rear ends of the rearwardly convergent arms 26, 26.

The lower rear corner portions of the box-like frame member 29 is connected in a similar manner by rearwardly convergent link bars 40, 40 to the underside of a ramp platform member 41 hinged to the rear transverse edge of the main bed member 16. Thus, the front edge of the ramp platform 41 and the rear edge of the main bed member are hingedly connected by a hinge assembly 42, and the rear ends of the link bar 40, 40 are pivotally connected to depending bracket members 43, 43 secured to the underside of the ramp platform 41 and located substantially at the midportion of said ramp platform.

The pivotal connections of the rear ends of link bars 40, 40 to the brackets 43, 43 are on a common transverse axis.

Figure 5:
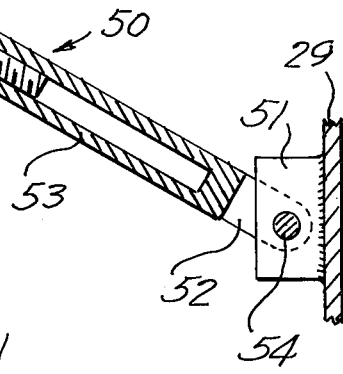
FIG. 5 is an enlarged longitudinal cross-sectional view taken through the resilient strut assembly employed in the semi-trailer of FIGS. 1–4, said view being taken substantially on line 5—5 of FIG. 1.
Figure 6:
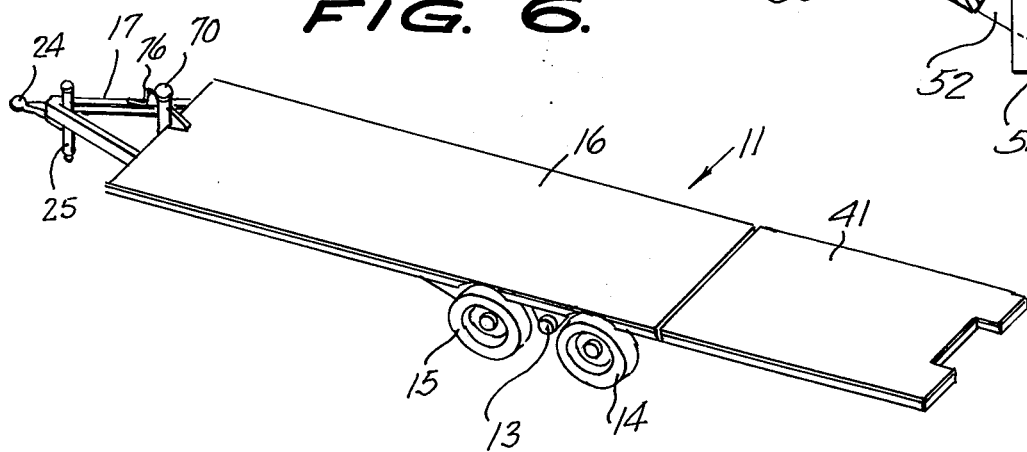
FIG. 6 is a rear perspective view of the semi-trailer of the present invention, shown in the normal position thereof illustrated in FIGS. 1 and 2.

A resilient strut assembly 50 is provided between the forward marginal portion of ramp platform 41 and the lower rear portion of the box-like frame member 29, acting to bias the ramp portion 41 toward alignment with the main bed member 16 when the main bed member is in its normal horizontal position, for example, that shown in FIG. 2. Thus, the lower corner portion of box-like member 29 is provided with a vertical lug 51 which is recieved between a pair of spaced lugs 52, 52 projecting from the end of a sleeve member 53, the lugs 52, 52 being pivotally connected to the frame lug 51 by a transverse bolt 54. Slidably received in the sleeve 53 is a threaded stud 55 of substantial length whose top end is similarly received in a sleeve member 56 having an end lug 57 received between and pivotally connected at 59 to a pair of depending lugs 58 secured to the underside of ramp member 41 adjacent the hinge connection thereof to the rear transverse edge of main bed member 16. A pair of adjustable stop nuts 60 and 61 are threaddedly engaged on the stud member 55, the upper nut 60 being abuttingly engagable against the end rim of sleeve member 56 and the lower stop nut 51 being engaged by the top portion of a biasing spring 62 whose lower portion bears against the rim of the relatively elongated sleeve 53. The nut 61 may be adjusted to provide a predetermined biasing force of spring 62 with the parts arranged in the manner illustrated in FIG. 5. Thus, with the parts in their horizontal positions, shown in FIG. 2, the tension of spring 62 may be adjusted to bias the hinged joint between bed 16 and ramp member 41 upwardly to resist any tendency for the hinged portions to move downwardly during normal travel of the semi-trailer. The strut assembly 50 therefore provides an adjustable shock-absorbing action and prevents abrupt distortions of the linkage interconnecting ramp member 41, the main bed member 16 and hitch frame 17.

The main bed member 16 is provided at the intermediate portion of its front edge with a conventional jack mechanism 70 which may comprise a jack sleeve 71 rigidly and perpendicularly connected to the transverse front edge of main bed member 16, the jack mechanism being provided with an extensible shaft element 74 whose bottom end is pivotally connected at 75 to the intermediate portion of the cross bar 23 of hitch frame 17. The jack mechanism 70 is provided with an operating handle 76 which can be manually rotated to extend or retract the movable thrust shaft 74. In operation, with the parts in normal positions, as shown in FIG. 2, the handle 76 may be operated to extend the thrust shaft 74, which acts against the hitch frame 17, causing frame 17 to rotate in a clockwise direction, as viewed in FIGS. 2 and 3, and causing the main bed member 16 to rotate in a counterclockwise direction around the axle 13. The upward movement of arms 26, 26 causes the link bars 32, 32 to rotate the box-like frame member 29 in a counterclockwise direction, as viewed in FIGS. 2 and 3, whereby the rear link bars 40, 40 pull the ramp platform 41 downwardly toward a position of ground engagement, such as that shown in FIG. 3. Thus, when the rear edge of ramp platform 41 engages the ground, the main bed member 16 is in an upwardly forwardly inclined position, with the ramp member 41 being inclined downwardly and rearwardly therefrom as shown in FIG. 3. This facilitates loading or unloading freight onto or off of the semi-trailer. After the loading or unloading operation, the parts may be restored to their normal position, such as shown in FIG. 2, by reversing the operation of the jack assembly 70.

As above explained, the rearwardly extending arm portions 26, 26 of hitch frame 17 are angled downwardly relative to the forward portions of the hitch frame, including elements 18, 18 and 22, 22, in order to provide sufficient clearance for the clockwise rotation of hitch frame 17, as above described, with respect to the underside of main bed member 16. By employing such an angled relationship between elements 26, 26 and the remainder of the hitch frame, the lengths of the respective pairs of supporting brackets 19, 19 is minimized and the hitch frame 17 can be received closely subjacent to the front portion of main bed member 16 in the normal horizontal positions of these elements, as shown in FIG. 2. Thus, this provides for increased compactness and mechanical stability of the assembly and permits use of the hitch frame 17 with normal conventional interengaging hitch means of the associated tractor vehicle. It will be thus seen that the hitch frame 17 acts in the manner of a bellcrank, with respect to the linkage interconnecting said hitch frame and the main bed member 16 and ramp platform 14.

It will be further seen that by employing the box-like frame member 29, which is movable to the transverse axle 13, the various parts of the mechanism are free to move without interference with axle 13.

It should be recognized that the jack mechanism 70 may be omitted, particularly for smaller sized trailers, in which case the ramp member 41 can be lowered or raised by pressure exercised at the rear end by one man only. The described arrangement of elements are so delicately balanced by the adjustment of resilient strut assembly 50 that eighty pounds of pressure is sufficient to raise or lower the ramp 41, whereas a comparably sized trailer of conventional structure would require four men to raise or lower its rear end.

While a specific embodiment of an improved semi-trailer assembly having a hinged rear ramp platform has been disclosed in the foregoing description, it will be understood that various mocifications within the spirit of the invention may occur to those skilled in the art. Therefore, it is intended that no limitations be placed on the invention except as defined by the scope of the appended claims.

What is claimed is:

1. A semi-trailer comprising a wheeled truck assembly having a transverse axle, a main load-carrying bed member pivotally mounted at its rear portion on said transverse axle, a forwardly extending hitch frame beneath the forward portion of said bed member, means pivotally connecting the intermediate portion of said hitch frame to the bed member for rotation on a transverse axis, a ramp platform hinged to the rear transverse edge of said bed member, jack means acting between said bed member and hitch frame to at times vary the angle therebetween, and linkage means interconnecting the rear end of the hitch frame, the rear portion of the bed member and said ramp platform to control the angular position of the ramp platform relative to the bed member in accordance with the angular position of the bed member relative to the hitch frame, said linkage means including a box-like frame member surrounding said axle and pivoted at its upper portion to said bed member, first link means connecting the front portion of said box-like frame member to the rear end portion of said hitch frame, and second link means connecting the ramp platform to the rear portion of said box-like frame member.

2. The semi-trailer of claim 1, and wherein said bed member is provided with depending bracket means over said transverse axle, and wherein the top portion of said box-like frame member is pivoted to said bracket means.

3. The semi-trailer of claim 1, and resilient support means acting between the forward margin of said ramp platform and said box-like frame member.

4. The semi-trailer of claim 1, and wherein the rear end portion of the hitch frame is angled downwardly relative to the forward portion thereof sufficiently so that said ramp platform can be lowered into ground contact responsive to the elevation of the front end of the bed member before the hitch frame rear end portion comes into contact with the underside of the bed member.

5. The semi-trailer of claim 4, and wherein said jack means comprises a jack assembly secured to the front transverse edge portion of the bed member and having a downwardly extensible portion drivingly engaged with said hitch frame.

6. The semi-trailer of claim 5, and resilient strut means acting between said ramp platform and a portion of said linkage means.

7. The semi-trailer of claim 6, and wherein said resilient strut means is connected between the forward marginal portion of said ramp platform and the rear portion of said box-like frame member.

8. The semi-trailer of claim 7 wherein said resilient strut means biases the ramp platform into substantial alignment with the main bedmember when the latter is in horizontal position, said strut means comprising a first sleeve pivoted at one end to said box-like frame member, a second sleeve pivoted at one end to the ramp member, a threaded rod slidably received in the free ends of the first and second sleeves, a pair of nuts threaded on said threaded rod, one of said nuts abutting a free end of one of said sleeves; and a coil spring surrounding the threaded rod and held between the free end of the other sleeve and the other nut.

9. A semi-trailer comprising a wheeled truck assembly having a transverse axle, a main load-carrying bed member pivotally mounted at its rear portion on said transverse axle, a forwardly extending hitch frame beneath the forward portion of said bed member, means pivotally connecting the intermediate portion of said hitch frame to the bed member for rotation on a transverse axis, a ramp platform hinged to the rear transverse edge of said bed member, a fulcrum member at least partially surrounding said axle and pivoted to said bed member, first link means pivotally connecting a forward portion of said fulcrum member to the rear end portion of said hitch frame, and second link means pivotally connecting the ramp platform to a rear portion of said fulcrum member, said fulcrum member and first and second link means being so constructed and arranged as to automatically rotate the ramp platform relative to the bed member as the hitch frame is raised or lowered.

10. A semi-trailer according to claim 9, and resilient strut means acting between said ramp platform and said fulcrum member to bias the ramp platform into substantial alignment with the main bed member when the latter is in horizontal position.

11. The semi-trailer of claim 9, and jack means acting between said bed member and hitch frame to at times vary the angle between.

\* \* \* \* \*